United States Patent
Tango (10) Patent No.: US 11,340,587 B2
(45) Date of Patent: *May 24, 2022

(54) NUMERICAL CONTROLLER

(71) Applicant: FANUC CORPORATION, Yamanashi (JP)

(72) Inventor: Chikara Tango, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 349 days.

This patent is subject to a terminal disclaimer.

(21) Appl. No.: 16/662,412

(22) Filed: Oct. 24, 2019

(65) Prior Publication Data

US 2020/0133237 A1    Apr. 30, 2020

(30) Foreign Application Priority Data

Oct. 31, 2018   (JP) .............................. JP2018-205918

(51) Int. Cl.
    *G05B 19/416*    (2006.01)
(52) U.S. Cl.
    CPC .. *G05B 19/416* (2013.01); *G05B 2219/34465* (2013.01); *G05B 2219/35386* (2013.01); *G05B 2219/42173* (2013.01)
(58) Field of Classification Search
    None
    See application file for complete search history.

(56) References Cited

U.S. PATENT DOCUMENTS

2006/0229761 A1\* 10/2006 Kita ................... G05B 19/4068
                                                        700/181
2008/0024083 A1   1/2008 Yamaguchi et al.
(Continued)

FOREIGN PATENT DOCUMENTS

JP    H07-191728 A    7/1995
JP    H10-254517 A    9/1998
(Continued)

OTHER PUBLICATIONS

An Office Action; "Notice of Reasons for Refusal", mailed by the Japanese Patent Office dated Dec. 8, 2020, which corresponds to Japanese Patent Application No. 2018-205918 and is related to U.S. Appl. No. 16/662,412; with English language translation.

(Continued)

*Primary Examiner* — Sean Shechtman
(74) *Attorney, Agent, or Firm* — Studebaker & Brackett PC (57) ABSTRACT

To provide a numerical controller that can detect the position at which the look-ahead blocks used to determine an acceleration/deceleration operation is insufficient in a machining program in order to stabilize feed rate, cutting speed and other factors. A numerical controller includes a program execution unit that executes a machining program, a program look-ahead unit that looks ahead at the machining program in parallel with execution of the machining program, a look-ahead blocks calculation unit that calculates a look-ahead blocks, which is the difference between a first sequence number that is the number of a block being executed by the program execution unit and a second sequence number that is the number of a block that is looked ahead by the program look-ahead unit while the machining program is being executed, and an exhaustion block detection unit that detects an exhaustion block, which is a block at which the look-ahead blocks falls below a prescribed value.

6 Claims, 9 Drawing Sheets

(56) References Cited

U.S. PATENT DOCUMENTS

2008/0294877 A1* 11/2008 Haga .................. G05B 19/4155
712/216
2016/0375582 A1    12/2016 Nakajima et al.
2019/0278248 A1     9/2019 Sagasaki
2020/0133242 A1     4/2020 Uenishi et al.

FOREIGN PATENT DOCUMENTS

JP       2001-034320 A    2/2001
JP         3723015 B2    12/2005

OTHER PUBLICATIONS

An Office Action mailed by the United States Patent and Trademark Office dated Dec. 8, 2021, which corresponds to U.S. Appl. No. 16/662,412 and is related to U.S. Appl. No. 16/662,412.
An Office Action mailed by the United States Patent and Trademark Office dated Nov. 29, 2021, which corresponds to U.S. Appl. No. 16/662,412 and is related to U.S. Appl. No. 16/662,412.

* cited by examiner

PRIOR ART

FIG. 9

NUMERICAL CONTROLLER

This application is based on and claims the benefit of priority from Japanese Patent Application. No. 2018-205918, filed on 31 Oct. 2018, the content of which is incorporated herein by reference.

BACKGROUND OF THE INVENTION

Field of the Invention

The present invention relates to a numerical controller.

Related Art

In the manufacturing industry today, IT parts and other devices are being manufactured on smaller scales and with higher precision, and interest in high-speed and high-precision machining is on the rise. In order to achieve even higher quality in machining, there has been an increase in the number of workpiece machining programs for high-speed and high-precision machining that are created with tolerances on smaller orders.

Conventionally, machining programs with small tolerances could not realistically be used due to low computer processing power. However, in recent years, both computer performance and computer aided manufacturing (CAM) performance have improved to the point where machining programs with small tolerances can now be easily created. This trend is expected to grow in years to come.

One aspect other than tolerance that is important when producing high-quality machining is uniformizing minute straight lines. Machining quality is increased when vibration is reduced through stabilizing acceleration/deceleration at each axle. As a result, there has been an increase in the number of high-quality machining programs featuring even minute straight lines. Therefore, machining programs are now made up of more blocks.

In the prior art, a numerical controller looks ahead at programs and reads out and processes a program for blocks to be executed next according to the first in, first out (FIFO) method from a number of programs stored in advance equal to look-ahead blocks. Then, the numerical controller determines an acceleration/deceleration operation and performs axis control.

However, such high-quality machining programs have the following problem. That is, the programs have short minute straight lines and fast command speed which means that, if the processing time for executing the program is shorter than the time required for look-ahead processing, the look-ahead blocks used to determine the acceleration/deceleration operation cannot be secured. As a result, acceleration/deceleration is not determined in consideration of program behavior and changes in speed are not constant and high-quality machining cannot be achieved.

Figure 9:
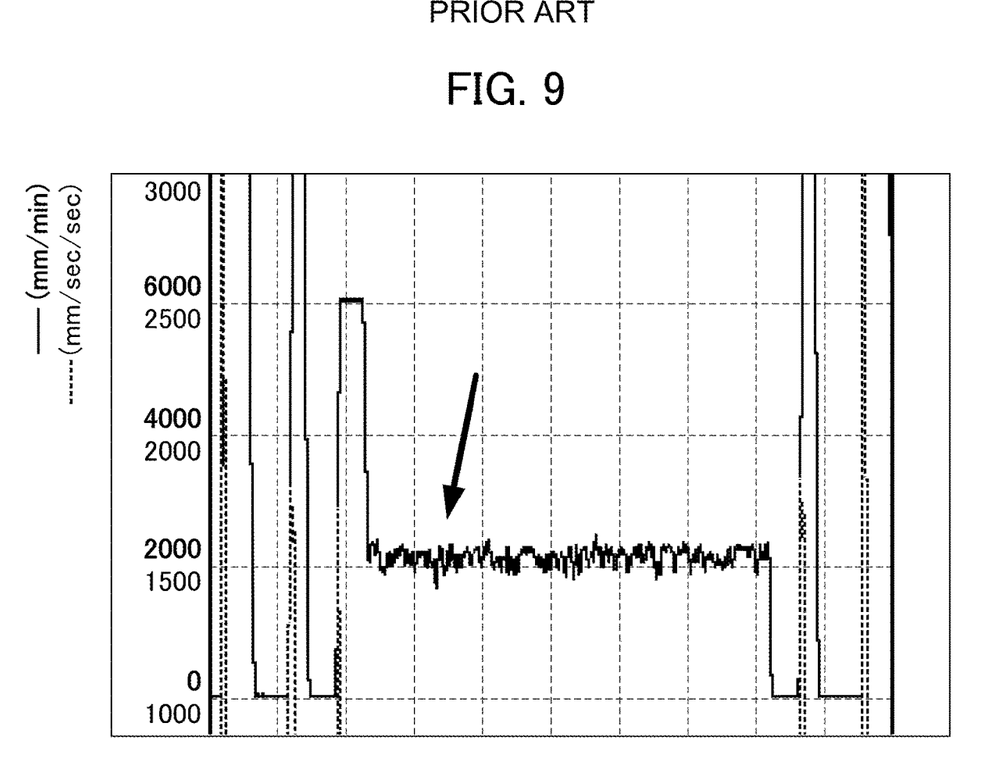
FIG. 9 is a graph for showing instability of speed due to inability to secure the look-ahead blocks.

FIG. 9 is a graph showing the difference in acceleration/deceleration over time when change in speed is unstable. As illustrated in FIG. 9, speed initially moves stably. However, at 2,000 mm/sec/sec, processing time for executing the program is too short and the look-ahead blocks used to determine the acceleration/deceleration operation could not be secured. Therefore, speed became unstable and moved slightly as indicated by the arrow in FIG. 9. Such behavior is particularly significant when a machine tool has a large number of axes, such as in 5-axis machining, and the processing power of the numerical controller is decreased. These problems can be solved by increasing the processing power of the numerical controller used for looking ahead or executing machining programs. However, similar problems occur when command speed is further increased by making programs more detailed or updating machines.

In order to provide a solution to these problems, the invention described in Patent Document 1 discloses a technology in which a numerical controller monitors whether if there is a deficiency or an excess of data in a buffer that is held by the FIFO method until analysis data consisting of analyzed NC data is used as acceleration/deceleration interpolation means. In particular, the technology determines that there is insufficient data when the amount of data predicted to exist in the buffer falls below a lower limit threshold value.

Patent Document 1: Japanese Patent No. 3723015

SUMMARY OF THE INVENTION

However, the technology disclosed in Patent Document 1 only increases the priority of the NC data analysis processing task when. it is determined that there is insufficient data, and does not determine what data in the NC data is insufficient or at which position there is insufficient data.

It is an object of the present invention to provide a numerical controller that can detect the position at which the look-ahead blocks used to determine an acceleration/deceleration operation is insufficient in a machining program in order to stabilize feed rate, cutting speed and other factors.

(1) A numerical controller (for example, a numerical controller 100 to be described later) according to the present invention is a numerical controller for controlling a machine tool that has axes by executing a machining program that is made up of a plurality of blocks and that controls acceleration/deceleration of the axes, the numerical controller including: a program execution unit (for example, a program execution unit 111 to be described later) that executes the machining program; a program look-ahead unit (for example, a program look-ahead unit 112 to be described later) that looks ahead at the machining program in parallel with execution of the machining program; a look-ahead blocks calculation unit (for example, a look-ahead blocks calculation unit 113 to be described later) that calculates look-ahead blocks, which is the difference between a first sequence number that is the number of a block being executed by the program execution unit and a second sequence number that is the number of a block that is looked ahead by the program look-ahead unit while the machining program is being executed; and an exhaustion block detection unit (for example, an exhaustion block detection unit 114 to be described later) that detects an exhaustion block, which is a block at which the look-ahead blocks falls below a prescribed value.

(2) The numerical controller described in Item (1) may further include an exhaustion block notification unit (for example, an exhaustion block notification unit 115 to be described later) that notifies outside the numerical controller of a position of the exhaustion block in the machining program.

(3) The numerical controller described in Item (1) or (2) may further include a recommended value calculation unit (for example, a recommended value calculation unit 116 to be described later) that, when the exhaustion block is detected, calculates a command speed as a recommended value for securing the look-ahead blocks from lengths of minute straight lines that make up a machining path followed by the machine tool, a look-ahead time taken by the program look-ahead unit and an execution time for each block.

(4) The numerical controller described in Item (3) may further include a recommended value notification unit (for example, a recommended value notification unit 117 to be described later) that notifies outside the numerical controller of the recommended value.

(5) The numerical controller described in Item (3) or (4) may further include a command speed update unit (for example, a command speed update unit 118 to be described later) that uses the recommended value calculated by the recommended value calculation unit to update a command speed that is set in the machining program after the exhaustion block.

(6) in the numerical controller described in Items (1) to (5), the program execution unit may stop the machining program when the exhaustion block is detected.

According to the present invention, it is possible to detect the position at which the look-ahead blocks used to determine an acceleration/deceleration operation is insufficient in a machining program in order to stabilize feed rate, cutting speed and other factors.

DETAILED DESCRIPTION OF THE INVENTION

Now, an embodiment of the present invention is described with reference to FIGS. 1 to 8.

1. Configuration of Invention

Figure 1:
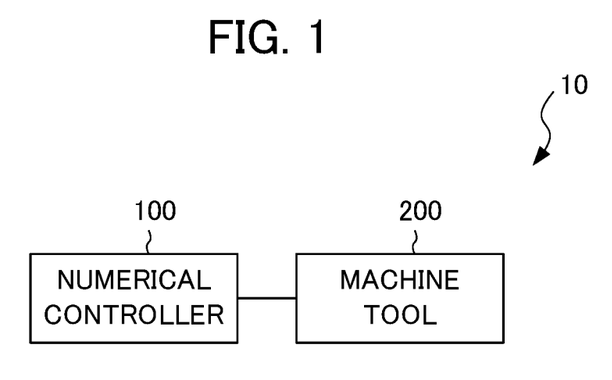
FIG. 1 is a diagram for illustrating the configuration of a control system including a numerical controller according to an embodiment of the present invention.

FIG. 1 illustrates the configuration of a control system 10 that includes a numerical controller 100 according to the present invention and a machine tool 200 that is controlled by the numerical controller 100.

The numerical controller 100 is a machine that outputs an operation command to the machine tool 200 to numerically control the machine tool 200 using functions to be described later. A detailed description of the configuration and functions of the numerical controller 100 is provided later.

The machine tool 200 is a device that performs predetermined machining such as cutting. The machine tool 200 includes a motor that is driven to machine workpiece and a spindle and a feed axis that are attached to the motor. The machine tool 200 also includes fixtures and tools that correspond to the respective axes. The motor of the machine tool 200 is driven on the basis of an operation command that is output from the numerical controller 100 such that the machine tool 200 performs predetermined machining. Herein, the contents of the predetermined machining are not particularly limited and types of machining other than cutting, such as grinding, polishing, rolling or forging, may also be employed.

Figure 2:
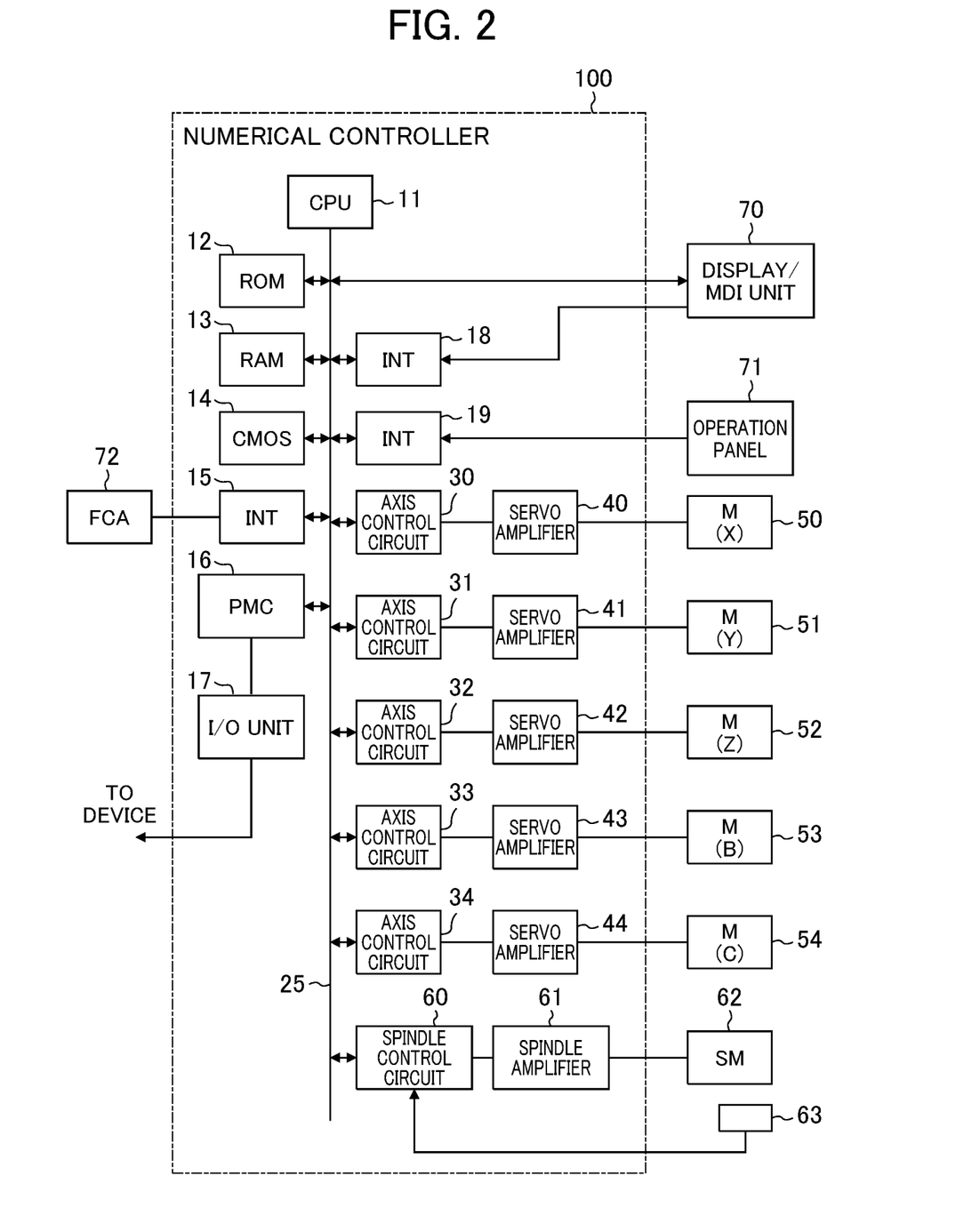
FIG. 2 is a diagram for illustrating the configuration of the numerical controller according to the embodiment of the present invention.

FIG. 2 illustrates an exemplary configuration of the numerical controller 100 according to the embodiment of the present invention. The numerical controller 100 primarily includes a CPU 11, a ROM 12, a RAM 13, a CMOS 14, interfaces 15, 18 and 19, a programmable machine controller (PMC) 16, an I/O unit 17, axis control circuits 30 to 34, servo amplifiers 40 to 44, a spindle control circuit 60, and a spindle amplifier 61.

The CPU 11 is a processor that controls the entire numerical controller 100. The CPU 11 reads out a system program that is stored in the ROM 12 via a bus 25 and controls the entire numerical controller 100 according to the system program.

The RAM 13 stores temporary calculation data and display data and various types of data that is input by an operator using a display/MDI unit 70.

The CMOS memory 14 is a non-volatile memory that is backed up by a battery (not shown) and that retains its storage state even when power to the numerical controller 100 is turned off. The CMOS memory 14 stores a machining program that was read to the CMOS memory 14 via the interface 15, a machining program that was input to the CMOS memory 14 via the display/MIDI unit 70, and other data.

The ROM 12 is pre-written with various types of system programs for executing processing for an edit mode required to create and edit machining programs and processing for automatic operation.

Various types of machining programs such as the machining programs for implementing the present invention can be input using the interface 15 or the display/MDI unit 70 and stored in the CMOS memory 14.

The interface 15 can connect the numerical controller 100 to an external device 72 such as an adaptor. Machining programs, various parameters and other data are read from the external device 72 side. Machining programs that are edited within the numerical controller 100 can be stored in external storage means using the external device 72.

The programmable machine controller (PMC) 16 outputs signals via the I/O unit 17 to an auxiliary device (for example, an actuator in the form of a robot hand used for replacing tools) for a machine tool using a sequence program stored in the numerical controller 100 and controls the device. The PMC 16 receives signals such as those for various switches on an operation panel provided in the body of the machine tool, and transmits those signals to the CPU 11 after executing required signal processing.

The display/MDT unit 70 is a manual data input device that includes components such as a display and a keyboard.

The interface 18 receives commands and data from a keyboard in the display/MDT unit 70 and transfers those commands and data to the CPU 11. The interface 19 is connected to an operation panel 71. The operation panel 71 includes a manual pulse generator.

The axis control circuits 30 to 34 for each axis receive movement command amounts for each axis from the CPU 11 and output the commands for each axis to the servo amplifiers 40 to 44.

The servo amplifiers 40 to 44 receive these commands and drive servo motors 50 to 54 for each axis. Each servo motor 50 to 54 for each axis includes a position/speed detector. The position/speed detectors output position/speed feedback signals that are fed back to each axis control circuit 30 to 34 to perform feedback control for position/speed. Note that this position/speed feedback is omitted from the block diagrams.

The spindle control circuit 60 receives a spindle rotation command for the machine tool and outputs a spindle speed signal to the spindle amplifier 61. The spindle amplifier 61 receives the spindle speed signal and rotates the spindle motor 62 of the machine tool at the commanded rotational speed to drive the tool.

The spindle motor 62 is connected to a pulse encoder 63 by a gear, a belt, or another component. The pulse encoder 63 outputs a feedback pulse in synchronization with rotation of the spindle. The feedback pulse is read by the CPU 11 via the bus 25.

In the exemplary configuration of the numerical controller 100 illustrated in FIG. 2, five axis control circuits (axis control circuits 30 to 35) and five servo motors (servo motors 50 to 54) are illustrated. However, the present invention is not limited to this configuration and any number of axis control circuits and servo motors may be provided.

Figure 3:
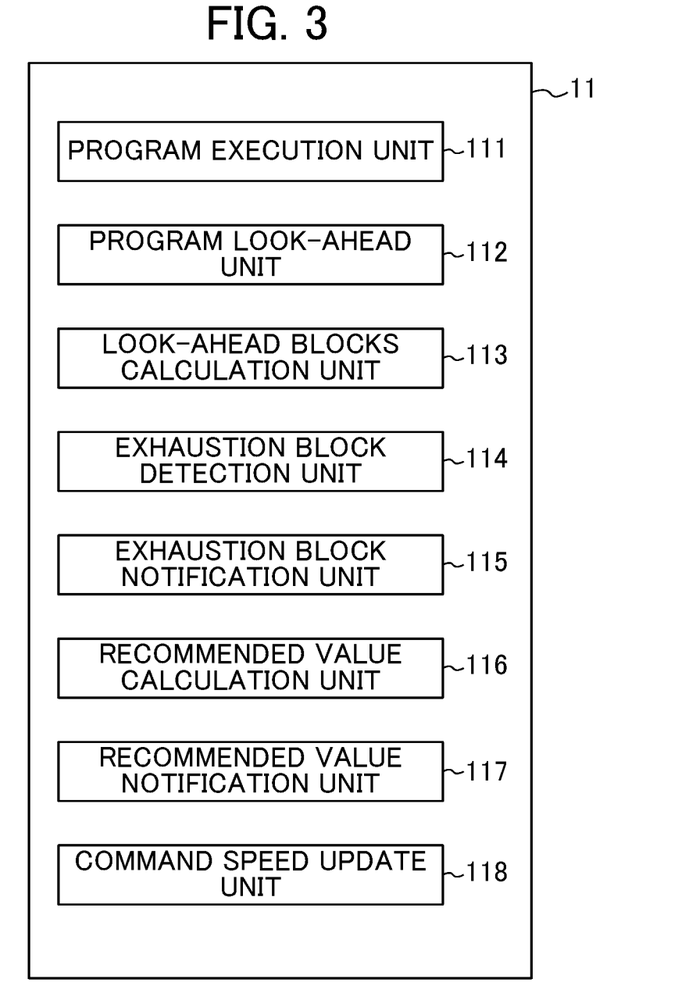
FIG. 3 is a diagram for illustrating function blocks for the numerical controller according to the embodiment of the present invention.

FIG. 3 is a function block diagram for illustrating a function where the CPU 11 reads out system programs and application programs stored in the ROM 12 via the bus 25 and implements the present invention according to those system programs and application programs. The CPU 11 includes a program execution unit 111, a program look-ahead unit 112, a look-ahead blocks calculation unit 113, an exhaustion block detection unit 114, an exhaustion block notification unit 115, a recommended value calculation unit 116, a recommended value notification unit 117 and a command speed update unit 118.

The program execution unit 111 executes a simulation of the machining program. During this simulation, it is preferable, for example, that workpiece be placed on the machine tool 200 and the machine tool 200 be actually operated, instead of just executing the machining program idly. This is because the difference in look-ahead blocks over time (to be described later) changes depending on the operating environment and the axis configuration of the machine tool 200.

In parallel with the simulation of the machining program executed by the program execution unit 111, the program look-ahead unit 112 looks ahead at the machining program before the simulation is executed.

The look-ahead blocks calculation unit 113 calculates the look-ahead blocks. This number is the difference between the sequence number of a block that is being executed by the program execution unit 111 and the sequence number of a block that is looked ahead by the program look-ahead unit 112 at the time when the first block is being executed.

Figure 4:
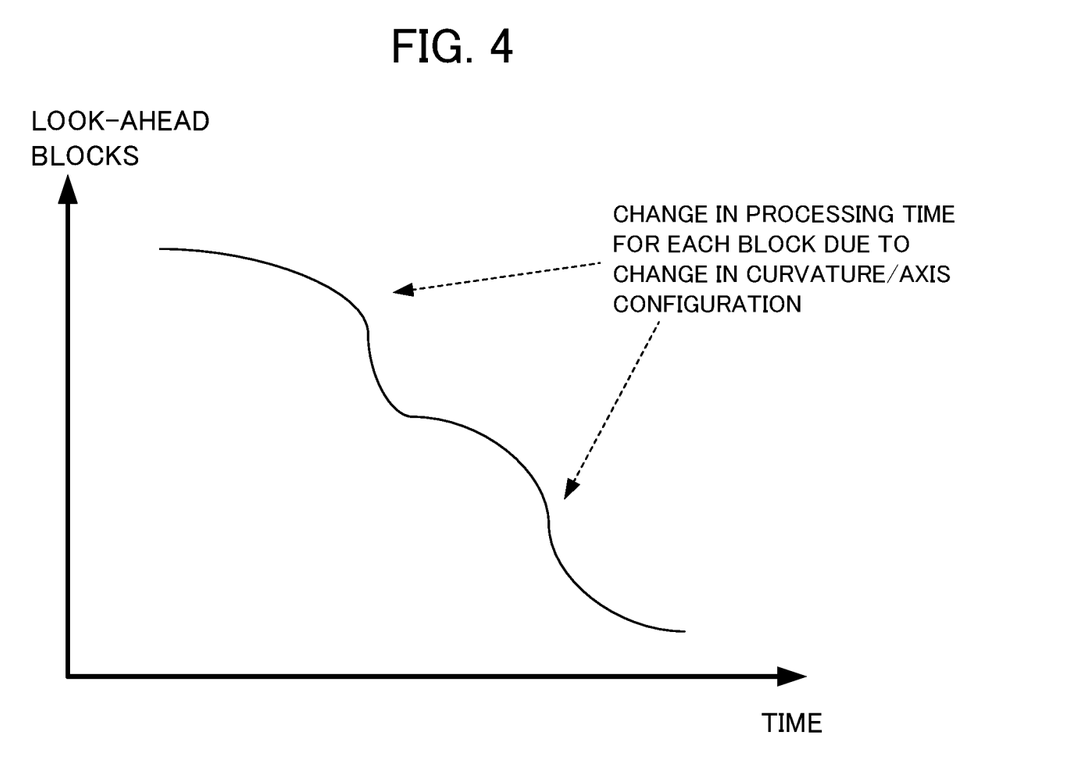
FIG. 4 is a graph for showing difference in the look-ahead blocks over time.

FIG. 4 is a graph showing the difference in the look-ahead blocks over time. The look-ahead blocks is zero when the position of a block to be looked ahead by the program look-ahead unit 112 or the position of a block to be executed by the program execution unit 111 reaches the end of the machining program. However, the look-ahead blocks usually does not evenly decrease to zero. The rate of reduction of look-ahead blocks changes depending on the processing time for each block, which differs due to a change in the curvature of the machining path or the axis configuration.

The exhaustion block detection unit 114 compares the look-ahead blocks to a prescribed value and detects the block at which the look-ahead blocks falls below the prescribed value. This block is referred to as an "exhaustion block".

The exhaustion block notification unit 115 notifies outside the numerical controller 100 of the position of the exhaustion block in the machining program. The exhaustion block notification unit 115 may display the position of the exhaustion block using, for example, the display/MDI unit 70 illustrated in FIG. 2.

When an exhaustion block is detected by the exhaustion block detection unit 114, the recommended value calculation unit 116 calculates a command speed as a recommended value from the lengths of minute straight lines that make up the machining path followed by the machine tool 200, the look-ahead time taken by the program look-ahead unit 112 and the execution time for each block that is executed by the program execution unit 111. More specifically, the command speed that serves as the recommended value is calculated according to the following Equation 1:

$$\text{Command speed as recommended value (mm/min)} \\ = 60 \times \text{length of minute straight lines (mm)/(look-ahead time+execution time for each block (msec))} \quad (1)$$

When an exhaustion block is detected by the exhaustion block detection unit 114, that is, when the look-ahead blocks falls below the prescribed value, the command speed set in the machining program is set to the recommended value to lower the machining speed and secure a specified look-ahead blocks. With this configuration, machining speed can be stabilized.

The recommended value notification unit 117 notifies outside the numerical controller 100 of the command speed as the recommended value that was calculated by the recommended value calculation unit 116. The recommended value notification unit 117 may display the recommended value using, for example, the display/MDI unit 70 illustrated in FIG. 2. With this configuration, the user of the numerical controller 100 can be aware of the command speed as the recommended value and can therefore set the recommended command speed in the machining program.

The command speed update unit 118 uses the command speed as the recommended value that was calculated by the recommended value calculation unit 116 to update the command speed that is set in the machining program after the exhaustion block. Typically, the command speed is updated so as to become lower.

Figure 5A:
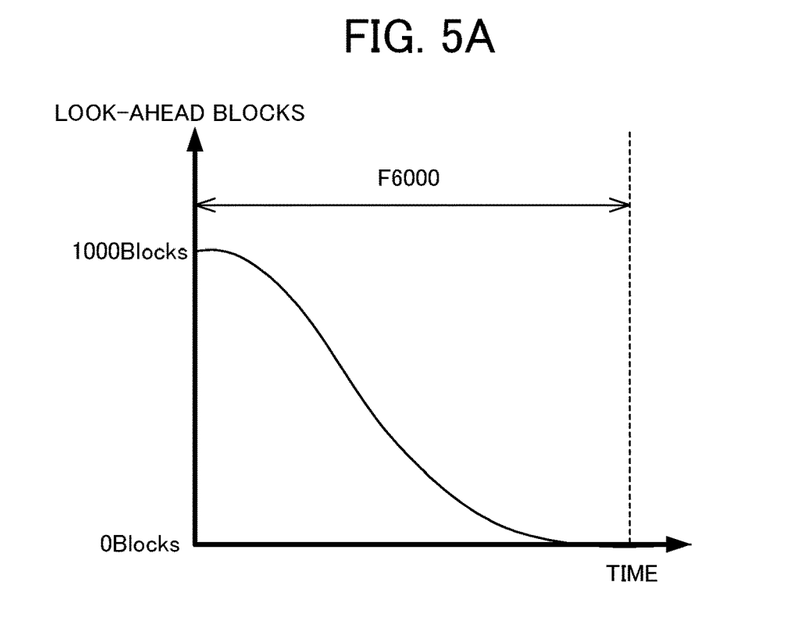
FIG. 5A is a graph for showing difference in the look-ahead blocks over time when command speed is not updated.
Figure 5B:
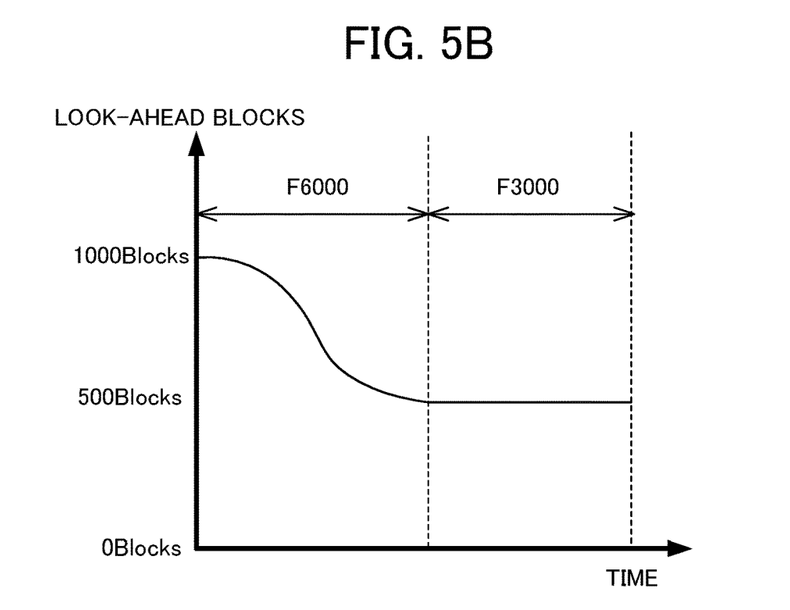
FIG. 5B is a graph for showing difference in the look-ahead blocks over time when command speed is updated.

FIG. 5A illustrates the difference in look-ahead blocks over time when the command speed update unit 118 has not updated a command speed that is set after the exhaustion block. FIG. 5B illustrates the difference in look-ahead blocks over time when the command speed update unit 118 has updated a command speed that is set after the exhaustion block.

As illustrated in FIG. 5A, if the command speed is not updated and, for example, the command speed is F6000, the look-ahead blocks steadily decreases from 1,000 blocks and eventually becomes zero.

On the other hand, as illustrated in FIG. 5B, when the command speed is initially F6000 but is updated to F3000 at the point when the look-ahead blocks falls below 500 blocks, the look-ahead blocks can be stably secured after the command speed is updated.

2. Operation of Invention

Now, the operation of the numerical controller 100 according to the present invention is described with reference to FIGS. 6 to 8.

2.1 First Operation

Figure 6:
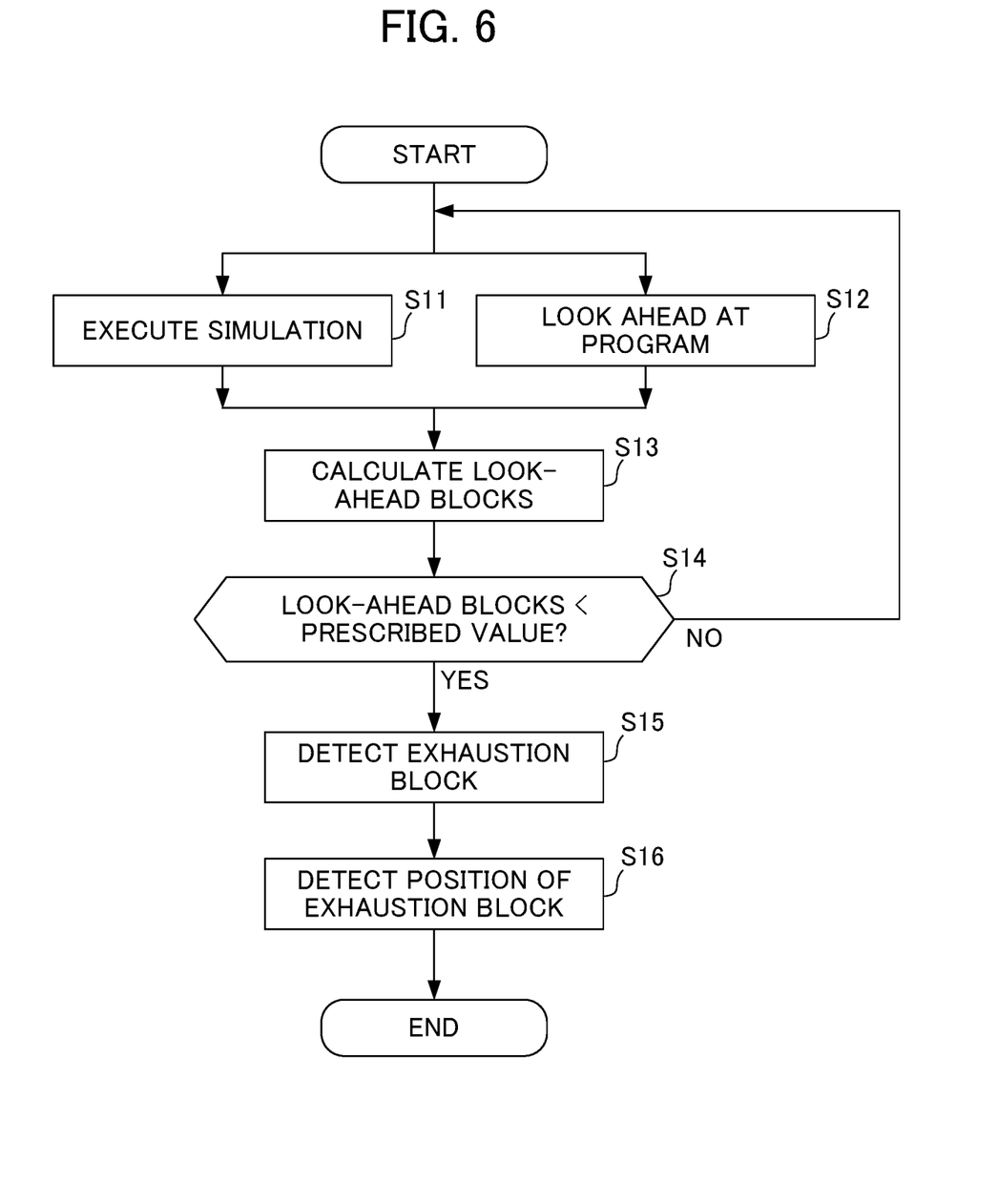
FIG. 6 is a flowchart for illustrating operation of the numerical controller according to the embodiment of the present invention.

FIG. 6 is a flowchart for illustrating a first operation of the numerical controller 100 according to the present invention. In Step S11, the program execution unit 111 executes a simulation of the machining program.

In Step S12, in parallel with the machining program simulation executed by the program execution unit 111, the program look-ahead unit 112 looks ahead at the machining program before executing the simulation.

In Step S13, the look-ahead blocks calculation unit 113 calculates the look-ahead blocks.

In Step S14, if the look-ahead blocks falls below a prescribed value (S14: YES), the processing moves to step S15. If the look-ahead blocks are more than or equal to the prescribed value (S14: NO), the processing moves to Steps S11 and S12.

In step S15, the exhaustion block detection unit 114 detects the exhaustion block.

In Step S16, the exhaustion block notification unit 115 notifies a device external of the numerical controller 100 of the position of the exhaustion block in the machining program.

2.2 Second Operation

Figure 7:
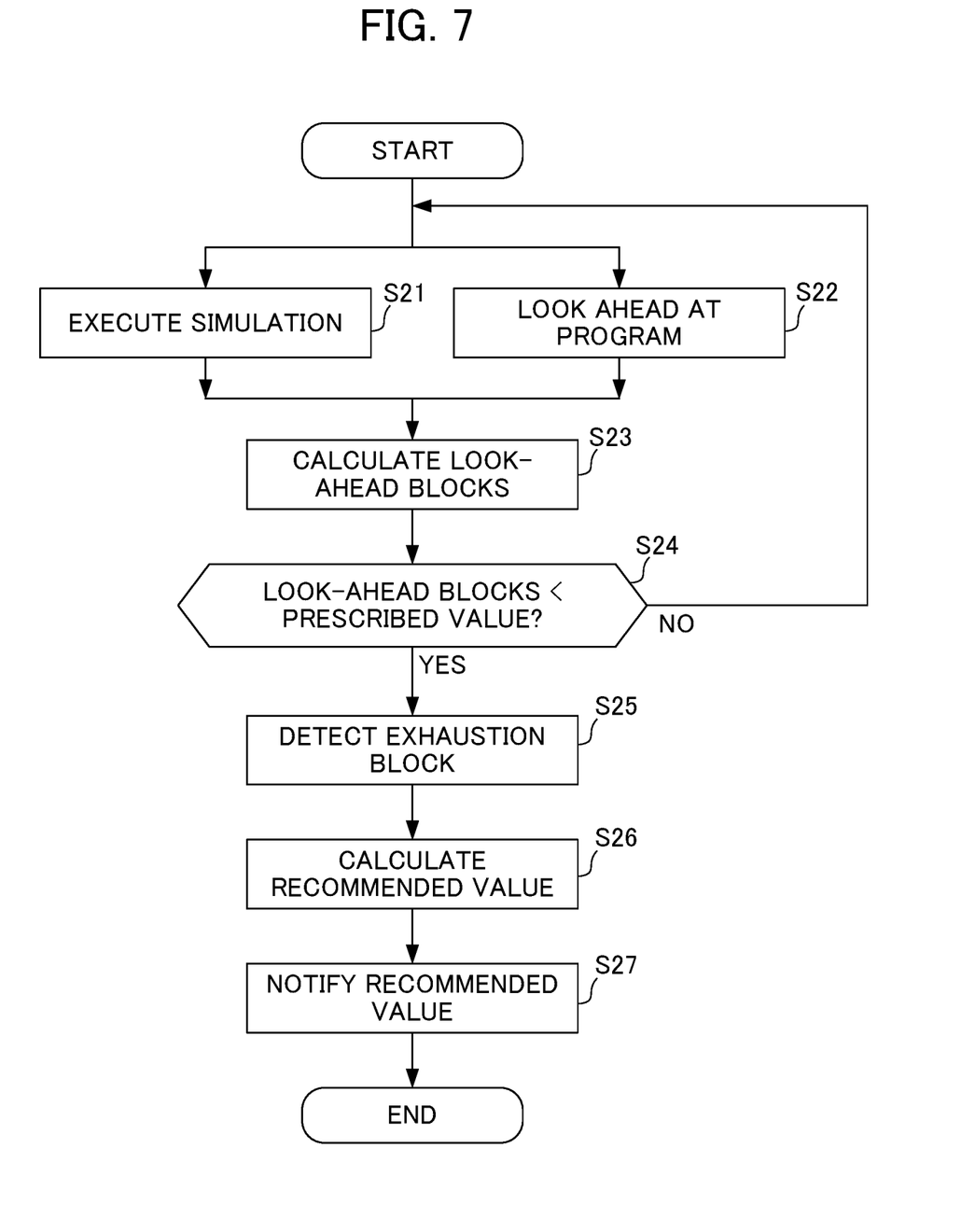
FIG. 7 is a flowchart for illustrating operation of the numerical controller according to the embodiment of the present invention.

FIG. 7 is a flowchart for illustrating a second operation of the numerical controller 100 according to the present invention. Note that Steps S21 to S25 in FIG. 7 are identical to Steps 11 to S15 in FIG. 6, respectively, and therefore a description of these steps is omitted.

In Step S26, the recommended value calculation unit 116 calculates the command speed as the recommended value. In Step S27, the recommended value notification unit 117 notifies outside the numerical controller 100 of the command speed as the recommended value.

2.3 Third Operation

Figure 8:
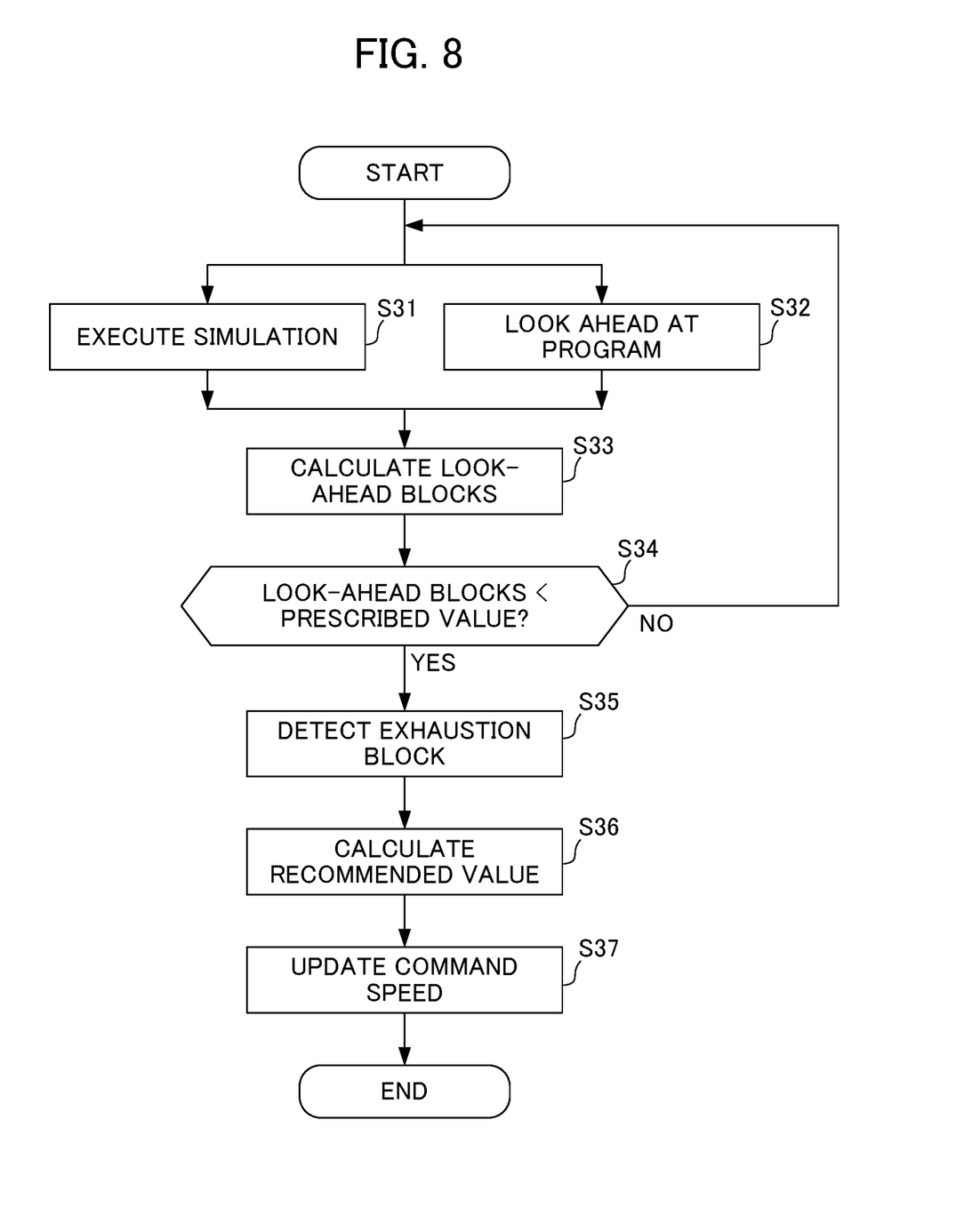
FIG. 8 is a flowchart for illustrating operation of the numerical controller according to the embodiment of the present invention.

FIG. 8 is a flowchart for illustrating a third operation of the numerical controller 100 according to the present invention. Note that Steps S31 to S36 in FIG. 8 are identical to Steps S21 to S26 in FIG. 7, respectively, and therefore a description of these steps is omitted.

In Step S37, the command speed update unit 118 uses the command speed as the recommended value to update the command speed that is set after the exhaustion block in the machining program.

3. Effects of the Embodiment

The numerical controller 100 according to this embodiment calculates the look-ahead blocks and detects an exhaustion block, which is a block at which the look-ahead blocks falls below a prescribed value. The look-ahead blocks is the difference between a first sequence number, which is the number of a block at which the simulation is executed by the program execution unit 111, and a second sequence number, which is the number of a block looked ahead by the program look-ahead unit 112 while the simulation is being executed.

With this configuration, it is possible to detect the position in the machining program at which the look-ahead blocks used for determining the acceleration/deceleration operation is insufficient in order to stabilize feed rate and cutting speed.

The numerical controller 100 according to this embodiment also notifies outside the numerical controller 100 of the position of the exhaustion block in the machining program.

As a result, the user of the numerical controller 100 can be aware of the position at which the look-ahead blocks will be insufficient.

Further, the numerical controller 100 according to this embodiment calculates a command speed as a recommended value for securing the look-ahead blocks.

With this configuration, machining speed of the machine tool 200 can be stabilized by the numerical controller 100.

The numerical controller 100 according to this embodiment also notifies outside the numerical controller 100 of the command speed as the recommended value for securing the look-ahead blocks.

As a result, the user of the numerical controller 100 can be aware of and set the command speed as the recommended value for securing the look-ahead blocks.

Further, the numerical controller 100 according to this embodiment uses the command speed as the recommended value for securing the look-ahead blocks to update the command speed that is set after the exhausted block in the machining program.

With this configuration, the user of the numerical controller 100 can automatically, not manually, set the command speed as the recommended value for securing the look-ahead blocks.

4. Modification Examples

4.1 Modification Example 1

In the above-described embodiment, when an exhaustion block is detected, a notification of the position of that exhaustion block is output and the command speed as the recommended value is calculated, but the present invention is not limited to this configuration. For example, the program execution unit 111 may stop the simulation of the machining program when an exhaustion block is detected.

4.2 Modification Example 2

In the above-described embodiment, the exhaustion block detection unit 114 defines an exhaustion block as a block at which the look-ahead blocks fall below a prescribed value, but the present invention is not limited to this configuration. For example, the exhaustion block detection unit 114 may define an exhaustion block as a block at which the rate of reduction of the look-ahead blocks exceeds a prescribed value.

4.3 Modification Example 3

In the above-described embodiment, the first to third operations are performed when the program execution unit 111 executes the machining program simulation, but the present invention is not limited to this configuration. For example, similar operations may be performed during actual machining in which the numerical controller 100 controls the machine tool 200.

An embodiment of the present invention has been described above, but the present invention is not limited to the above-described embodiment. Any described effects are merely the best effects achieved by the present invention and the effects achieved by the present invention are not limited to the description provided herein.

The control method used by the numerical controller 100 is implemented by software. When using software, the programs that constitute said software are installed on a computer (numerical controller 100). These programs may be recorded on a removable medium and distributed to a user or may be made available as a file to be downloaded to a user's computer via a network. These programs may also be provided to a user's computer (numerical controller 100) as an Internet service via a network, instead of being downloaded.

EXPLANATION OF REFERENCE NUMERALS

10 control system
100 numerical controller
111 program execution unit
112 program look-ahead unit
113 look-ahead blocks calculation unit
114 exhaustion block detection unit
115 exhaustion block notification unit
116 recommended value calculation unit
117 recommended value notification unit
118 command speed notification unit
200 machine tool

What is claimed is:

1. A numerical controller for controlling a machine tool that has axes by executing a machining program that is made up of a plurality of blocks and that controls acceleration/deceleration of the axes, the numerical controller comprising a processor, the processor being configured to:
   execute the machining program;
   look ahead at the machining program in parallel with execution of the machining program;
   calculate a number of look-ahead blocks, the number being a difference between a first sequence number that is the number of a block being executed and a second sequence number that is the number of a block that is being looked ahead while the machining program is being executed;
   detect an exhaustion block, which is a block at which the calculated number of look-ahead blocks falls below a prescribed value; and
   adjust a machining speed of the machine tool based on the detected exhaustion block.

2. The numerical controller according to claim 1, wherein the processor is further configured to notify outside the numerical controller of a position of the exhaustion block in the machining program.

3. The numerical controller according to claim 1, wherein the processor is further configured to calculate a command speed as a recommended value for securing the look-ahead blocks from lengths of minute straight lines that make up a machining path followed by the machine tool, a look-ahead time, and an execution time for each block when the exhaustion block is detected.

4. The numerical controller according to claim 3, wherein the processor is further configured to notify outside the numerical controller of the recommended value.

5. The numerical controller according to claim 3, wherein the processor is further configured to use the calculated recommended value to update a command speed that is set in the machining program after the exhaustion block.

6. The numerical controller according to claim 1, wherein the processor stops the machining program when the exhaustion block is detected.

* * * * *